No. 619,871.  
J. J. CZEPULL.  
VEHICLE TIRE.  
(Application filed May 2, 1898.)  
(No Model.)  
Patented Feb. 21, 1899.

Witnesses:  
W. M. Hall.  
C. G. Bassler.

Inventor.  
Julius J. Czepull  
By Attorney.  
Wm. R. Gerhart.

THE NORRIS PETERS CO., PHOTO-LITHO., WASHINGTON, D. C.

UNITED STATES PATENT OFFICE.

JULIUS J. CZEPULL, OF LANCASTER, PENNSYLVANIA.

VEHICLE-TIRE.

SPECIFICATION forming part of Letters Patent No. 619,871, dated February 21, 1899.

Application filed May 2, 1898. Serial No. 679,423. (No model.)

*To all whom it may concern:*

Be it known that I, JULIUS J. CZEPULL, a citizen of Prussia, and a resident of Lancaster, county of Lancaster, State of Pennsylvania, have invented certain Improvements in Vehicle-Tires, of which the following is a specification.

My invention relates to improvements in tires for bicycles and for any other vehicles to which they can be applied; and the objects of the invention are, first, to produce tires that will have a high degree of elasticity, and, second, to so construct the same that they will not collapse when the tire is cut or punctured.

The invention consists in the construction and combination of the various parts, as hereinafter fully described and then pointed out in the claims.

My improved tires are illustrated in the accompanying drawings, in which—

Figure 1:
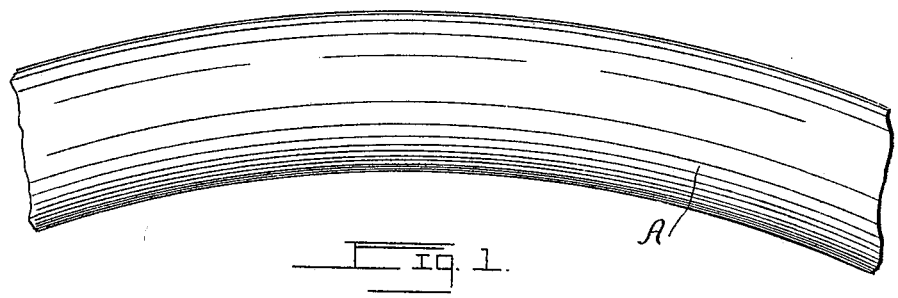
Figure 2:
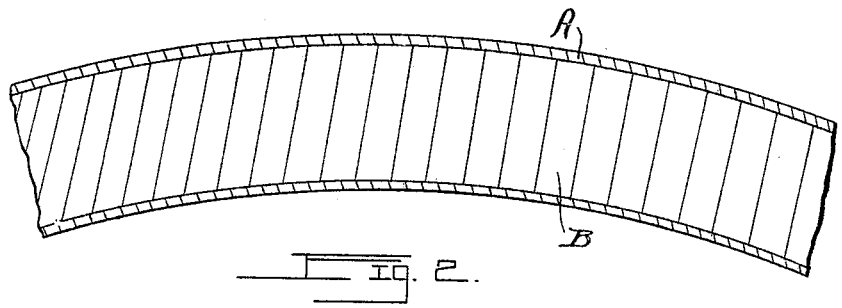

Figure 1 is a side view of a section of a tire embodying my improvements, and Fig. 2 a vertical section of the same.

Similar letters indicate like parts in both views.

Referring to the drawings, A indicates a rubber tube similar to that usually employed for the pneumatic tires of bicycles, and the invention is applicable to any old tire already in use. This tube may also be constructed of any other yielding or elastic material suitable for the purpose. I fill the tube with a composition of glue and alcohol prepared as follows: I take a sufficient quantity of ordinary glue and heat the same until it is brought to the consistency of jelly. To this jelly while in a heated condition is added about two per cent. of alcohol. After the jelly and the alcohol are thoroughly commingled the mixture is injected into the tube until the same is filled. The alcohol serves to preserve the glue in its viscous or glutinous state and as an antiseptic. In practice when the glue has been reduced to a proper state of consistency the alcohol is added thereto while the glue is still subjected to heat or while still in a heated state, and I have been in the habit of injecting the mixture into the tube while said mixture was in a heated condition.

The mixture can also be used with a flexible non-elastic tube.

I have not shown any valve for closing the opening through which the mixture is injected into the tube, as the same forms no part of my invention and any suitable means for closing said opening may be employed.

With a tire thus filled the ordinary closing pressure of a rubber or other elastic tube or of a flexible non-elastic tube, such as leather and the like, is sufficient to prevent the escape of the filling mixture by reason of its consistency, thus preventing any collapse of the tube.

I do not confine myself to the precise details of the construction shown and described or to those of the process of constructing the tires, as it is obvious that changes may be made therein without departing from the spirit and scope of my invention.

Having thus described my invention, what I claim as new, and desire to secure by Letters Patent, is—

1. A vehicle-tire comprising an elastic or a flexible tube filled with a composition of glue and alcohol, substantially as described.

2. A vehicle-tire comprising an elastic or a flexible tube, and a filling for said tube, consisting of a mixture of glue and about two per cent. of alcohol, for the purpose specified.

JULIUS J. CZEPULL.

Witnesses:
C. G. BASSLER,
WM. R. GERHART.